UNITED STATES PATENT OFFICE.

FRIEDRICH KRECKE AND IGNAZ ROSENBERG, OF BIEBRICH, GERMANY, ASSIGNORS TO KALLE & CO., OF SAME PLACE.

BLUE-BLACK DYE.

SPECIFICATION forming part of Letters Patent No. 546,070, dated September 10, 1895.

Application filed June 20, 1895. Serial No. 553,478. (Specimens.) Patented in Germany September 10, 1891, No. 73,901.

*To all whom it may concern:*

Be it known that we, FRIEDRICH KRECKE, doctor of philosophy, a subject of the King of Prussia, German Emperor, and IGNAZ ROSENBERG, doctor of philosophy, a subject of the King of Hungary, residing at Biebrich-on-the-Rhine, in the Empire of Germany, have invented certain new and useful Improvements in the Manufacture of a Bluish-Black Disazo Dye-Stuff, which dyes on mordanted wool, (for which our assignees, KALLE & CO., have already obtained a patent in Germany, No. 73,901, dated September 10, 1891,) of which the following is a specification.

In order to carry out our invention we act upon the $alpha_1$ naphthylamine-$beta_4$ monosulfo-acid, which may be obtained by nitration and reduction of naphthalene-beta-monosulfo-acid with diazo-salicylic-acid, which is prepared by treating amido-salicylic-acid with nitrous acid. The so-formed amido-azo body, which is characterized by the formula

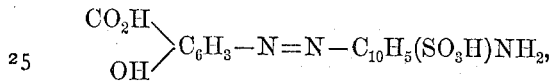

is transformed by nitrous acid into a diazo-azo-body and finally put into reaction with sulfo-acids of alpha or beta naphthol. As an example, we shall describe the process employed for the manufacture of the coloring-matter containing beta-naphthol-beta-disulfo-acid (R-salt) as final component which dyes a blue-black shade on chromed wool. We dissolve 19 kilos (nineteen kilograms) of hydrochlorate of amido-salicylic-acid (obtained by nitration and reduction of salicylic acid) in 300 liters (three hundred liters) of water, acidulated by 13 kilos (thirteen kilograms) of muriatic acid of 20° Baumé and diazotize in the cold by addition of 7 kilos (seven kilograms) of sodium nitrite in aqueous solution. The so-obtained diazo-salicylic-acid is stirred into a cold solution of 25 kilos (twenty-five kilograms) of $alpha_1$ naphthylamine-$beta_4$ monosulfonate of sodium (which is obtained by nitration of naphthalene-beta-monosulfo-acid in sulfuric acid solution and reduction of the resulting alpha-nitro-naphthalene-beta-sulfo-acid) and 7 kilos (seven kilograms) of soda-ash in 150 liters (one hundred and fifty liters) of water. After the mixture has been agitated some hours the formation of the amido-azo body is complete. The latter is then transformed into the diazo-azo body by addition of 32 kilos (thirty-two kilograms) of muriatic acid of 20° Baumé and 7 kilos (seven kilograms) of sodium nitrite in aqueous solution and mixed with a cold solution of 35 kilos (thirty-five kilograms) of beta-naphthol-beta-disulfonate of sodium (R-salt) and 12 kilograms of soda-ash in 200 liters (two hundred liters) of water. The so-formed coloring-matter separates completely by itself from the solution and is filtered off and dried. It forms a brownish-black amorphous powder with metallic luster. It dyes a bluish black on chromed wool, which is fast to milling and light. It is easily soluble in water, insoluble in strong alcohol, and moderately in dilute alcohol. The violet solution in water turns blue on addition of ammonia and red on addition of mineral acids. The solution of the color in strong sulfuric acid is greenish blue.

Instead of the R-salt in the example given above other sulfonates of alpha and beta naphthol may be taken, which have the property to form azo-colors when acted upon with diazo-bodies.

Now, what we claim is—

As a new product of manufacture the new coloring matter of the formula:

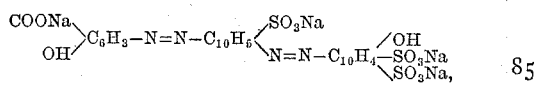

which forms after drying and pulverizing a brownish-black amorphous powder, dyeing a bluish-black on chromed wool which is fast to milling and light; soluble in water, insoluble in spirits, moderately soluble in dilute alcohol, the violet solution in water turning blue on the addition of ammonia, and red on the addition of mineral acids; the solution of the color in strong sulfuric acid is greenish-blue; and which is producible from amido-salicylic acid, alpha naphthylamine beta monosulfonate of sodium and naphthol disulfoacid R.

In testimony whereof we have signed our names to this specification in the presence of two subscribing witnesses.

FRIEDRICH KRECKE.
IGNAZ ROSENBERG.

Witnesses:
CARL ED. HAHN,
HEINRICH MISCHLER.